Oct. 4, 1966  W. R. PEARCE ETAL  3,276,963
FLUX TRAP RESEARCH NUCLEAR REACTOR
Filed May 16, 1962  8 Sheets-Sheet 1

INVENTORS
William R. Pearce
Oscar J. Elgert
Byron H. Leonard, JR.
BY Sidney C. Ring
Lyman T. Glass
ATTORNEYS

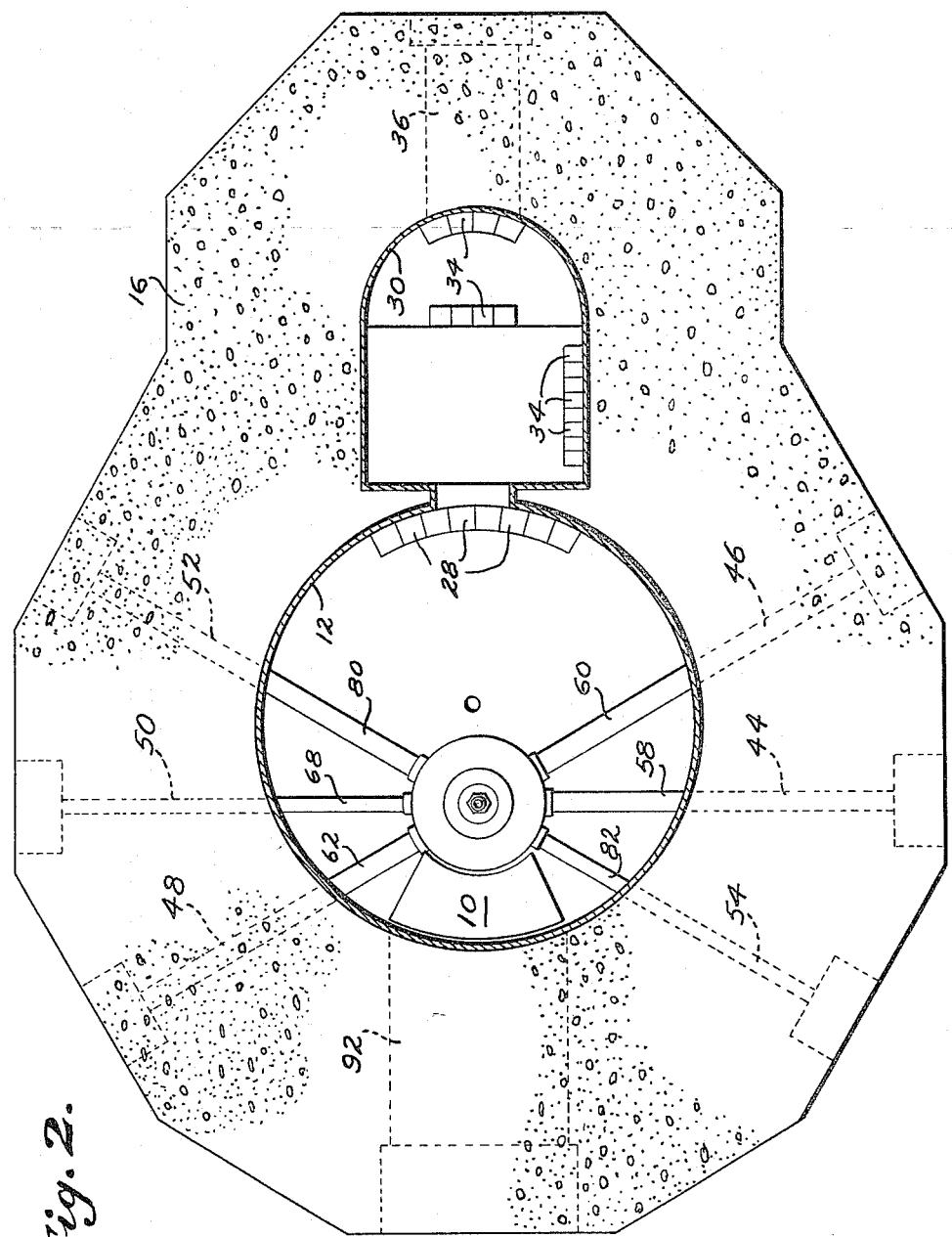

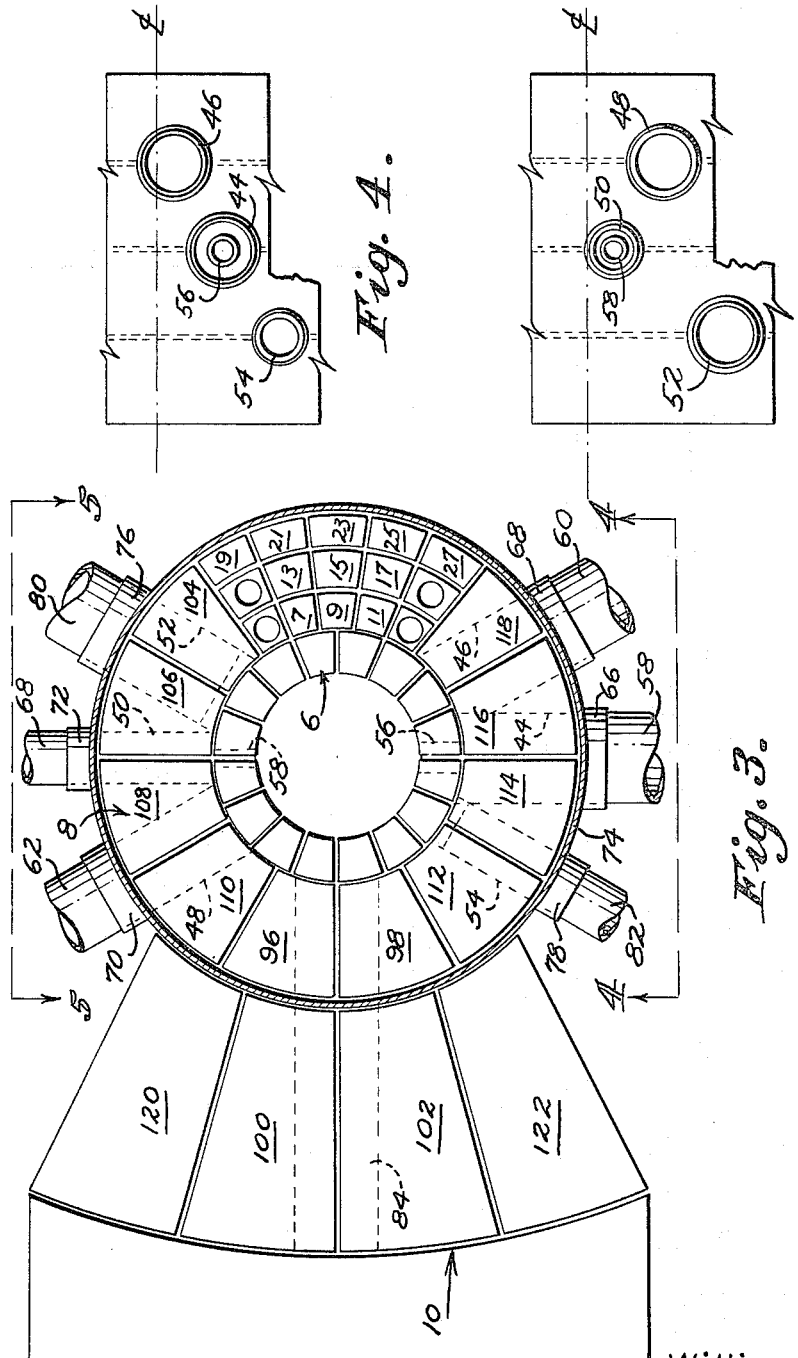

Oct. 4, 1966 W. R. PEARCE ETAL 3,276,963
FLUX TRAP RESEARCH NUCLEAR REACTOR
Filed May 16, 1962 8 Sheets-Sheet 4
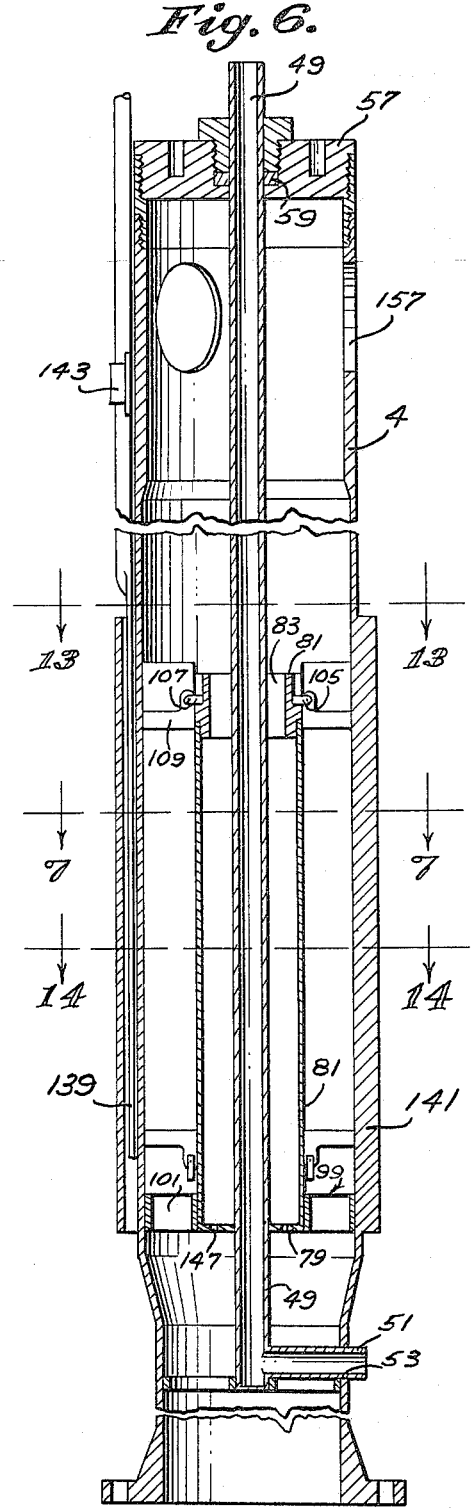
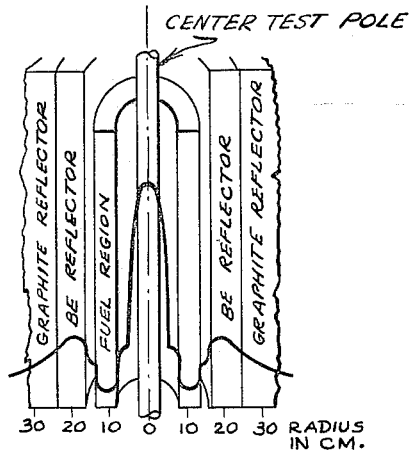
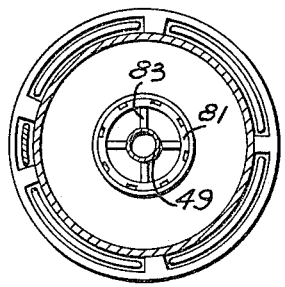
William R. Pearce
Oscar J. Elgert
Byron H. Leonard Jr.
INVENTORS
BY
ATTORNEYS

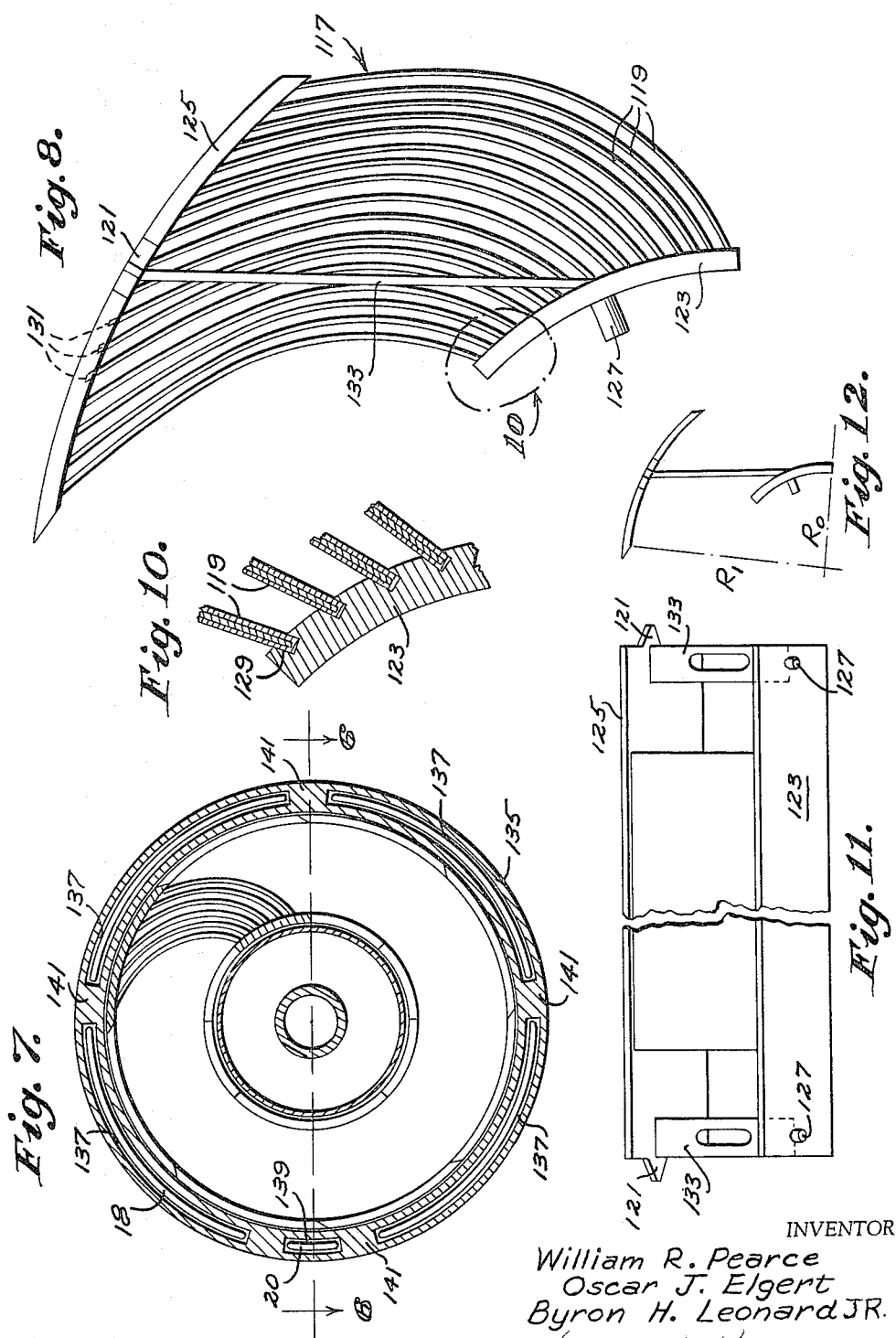

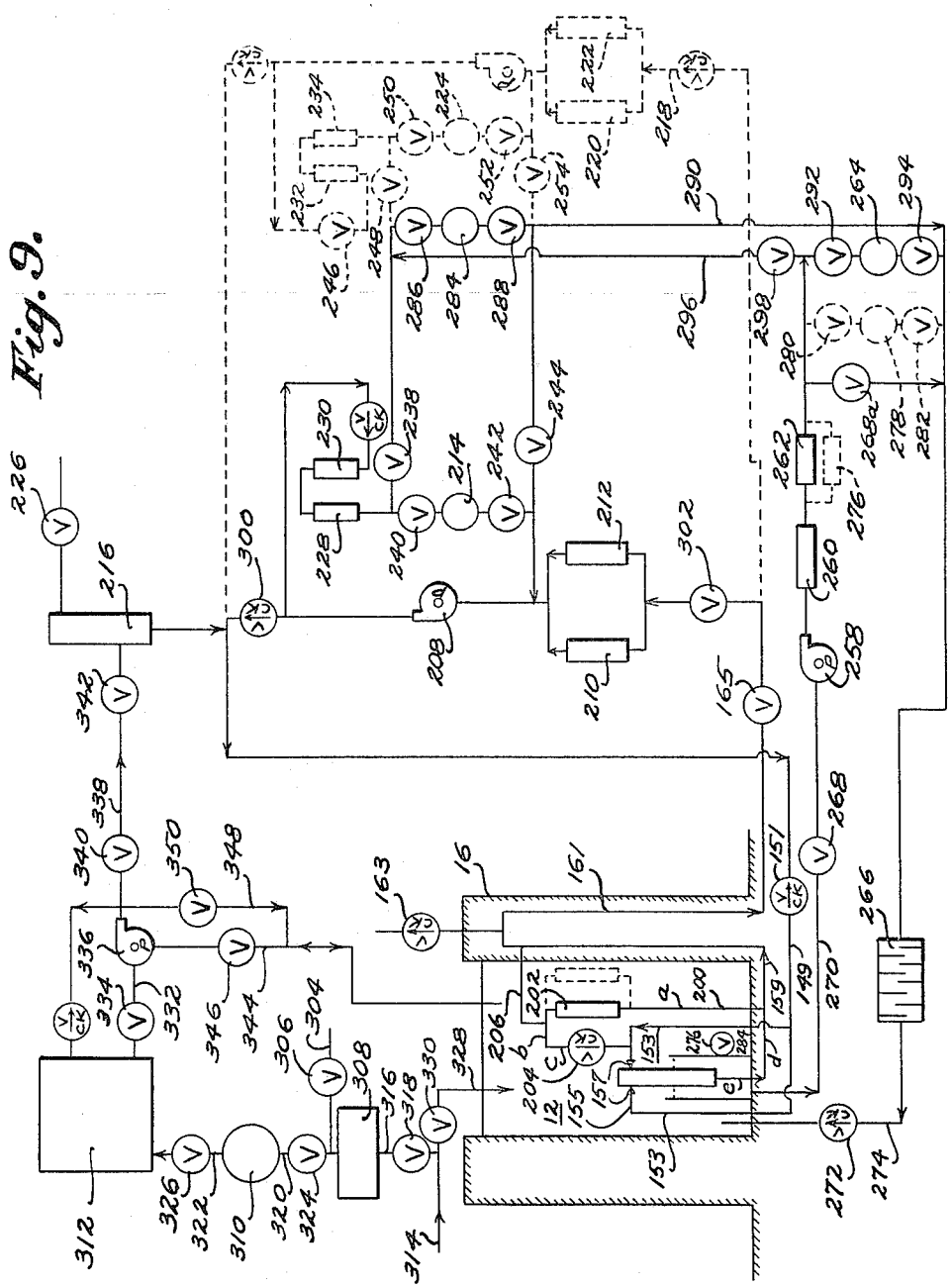

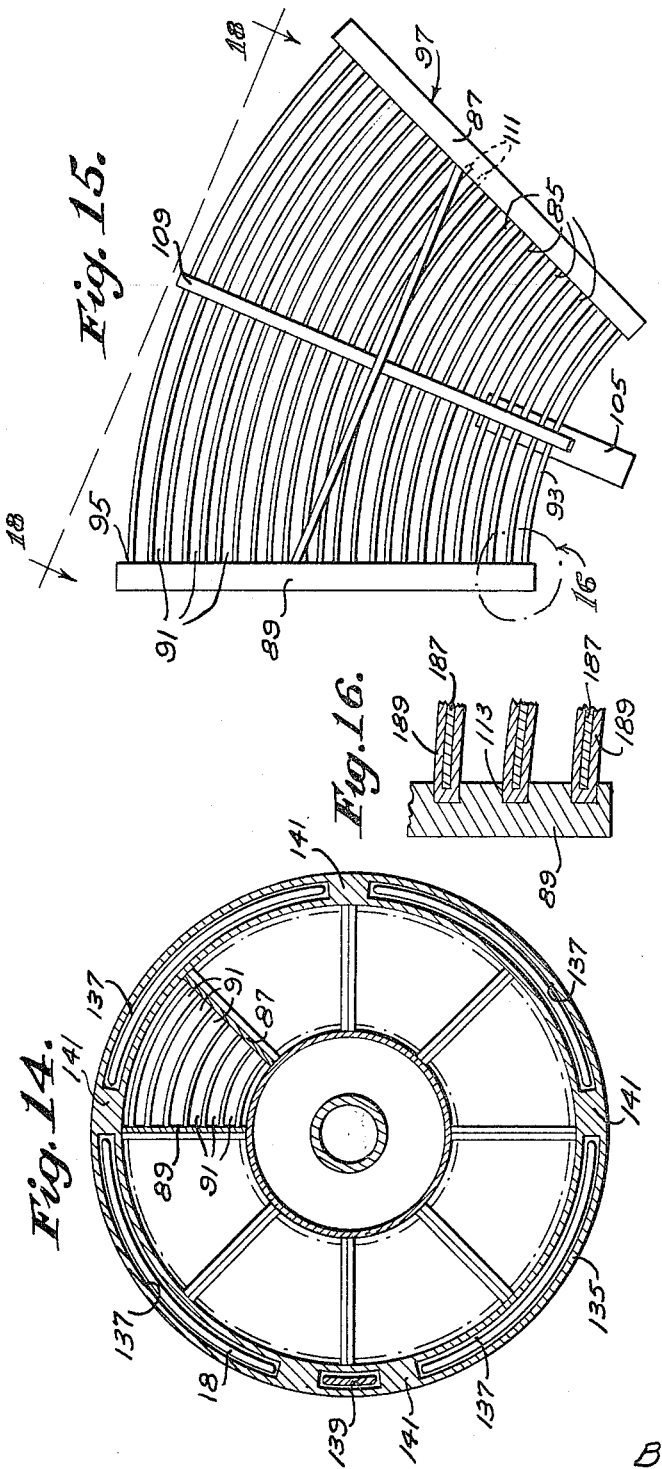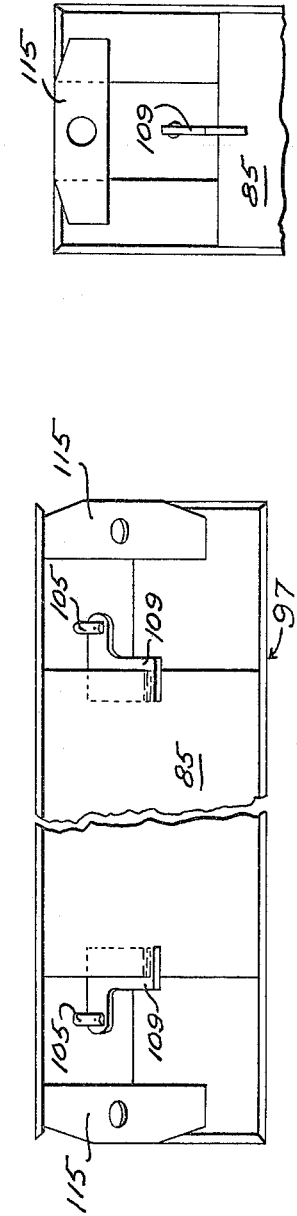

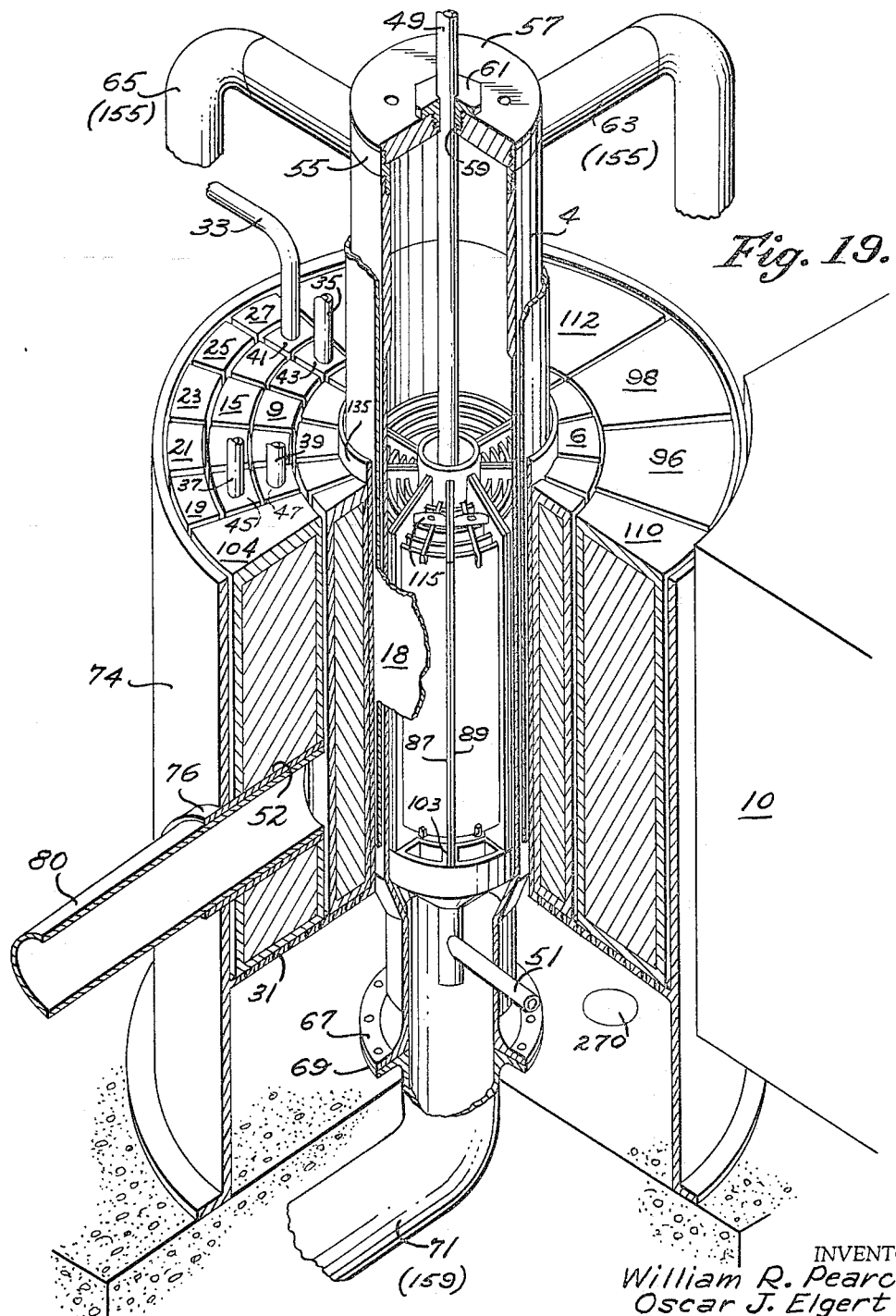

United States Patent Office 3,276,963
Patented Oct. 4, 1966

3,276,963
FLUX TRAP RESEARCH NUCLEAR REACTOR
William R. Pearce, Clayton, Oscar J. Elgert, Affton, and Byron H. Leonard, Jr., Richmond Heights, Mo., assignors to Internuclear Company
Filed May 16, 1962, Ser. No. 195,128
2 Claims. (Cl. 176—18)

This invention relates to research nuclear, or neutronic, reactors and more particularly to flux-trap nuclear reactors primarily for use in research and development.

Nuclear reactors and their construction and operation are well known and specific details of the theory and essential characteristics of nuclear reactors are set forth in prior art publications including, among others, (1) U.S. Patent No. 2,708,656, issued on May 17, 1955, to E. Fermi and L. Szilard, (2) Experimental Production of Divergent Chain Reaction, E. Fermi, American Journal of Physics, vol. 20, No. 9, December 1952, (3) Science and Engineering of Nuclear Power, C. Goodman, Addison-Wesley Press, Inc., Cambridge, Mass., vol. 1 (1947) and vol. 2 (1949), (4) The Elements of Nuclear Reactor Theory, S. Glasstone and M. Edlund, D. Van Nostrand Co., Inc., New York, 1952, (5) Elementary Pile Theory, H. Soodak and E. C. Campbell, John Wiley and Sons, New York, 1950, (6) Current Status of Nuclear Reactor Theory, A. Weinberg, Am. J. of Phys., vol. 20, October 1952, pp. 401–412, (7) Multigroup Methods for Neutron Diffusion Problems, R. Ehrlich and H. Hurwitz, Jr., Necleonics, vol. 12, No. 2, February 1954, pp. 23–30, (8) Neutron Cross Sections, A.E.C.U.–2040, OTS, Dept. of Commerce, and (9) the engineering test reactor utilizing the flux-trap principle disclosed in U.S. Patent No. 2,857,324, issued on October 21, 1958.

In research nuclear reactors it is highly desirable to obtain maximum neutron utilization coupled with maximum accessibility for experimentation in regions of high neutron flux, and the most effective method for achieving this is to employ the flux-trap principle in a nuclear reactor which is characterized by thin fuel regions adjacent to a good moderator which slows down the neutrons and causes the thermal neutron flux to peak in a region accessible for experimentation. The simplest geometry and the most effective for small test samples is an annular core surrounding a light water island having a test well, or test hole. Typical unperturbed thermal neutron fluxes in the test hole, or well, may be four to six times that available in the reflector of a typical solid core research nuclear reactor operated at the same power level. In a nuclear reactor utilizing the flux-trap principle the advantage of high leakage applies also to neutron utilization outside of the reactor core and beamport currents, in particular, are favorably increased for the reason that the magnitude of the collimated current depends essentially on the power density of the core surface, the thin core region of the flux-trap reactor leading to power densities up to three times those of typical solid-core research reactors, thereby resulting in corresponding gains in beamport current.

Although open pool flux-trap reactors can be constructed in the lower power range such as up to 5 mw., the open pool type is limited in higher power level by several effects such as (1) heat exchange requirements and (2) pool activity. Since the core water must enter at pool temperature, the mean temperature difference is small while surface requirements are large. Since the aluminum clad fuel leads to sodium activity [$Al^{27}(n,\alpha)Na^{24}$], this activity is generally removed by an ion exchange demineralizer, and the production of $Na^{24}$ increases as the power level of the reactor increases. For example, at 10 mw., demineralizer flow of 400 G.P.M. is required to obtain tolerance at the surface of a pool of normal size, and demineralizing such large amounts of water requires large and expensive demineralizer systems.

The effectiveness of a research nuclear reactor utilizing the flux-trap principle can be enhanced by pressurizing that portion thereof including the core, the reflector and the controls therefor, but, when pressurized vessels are employed, complicated sealing systems for allowing the controls, or control rods, to be inserted into such a pressurized vessel without any loss in pressure must be employed.

We have discovered and now provide for the first time a simplified research nuclear reactor utilizing the flux-trap principle comprising a pressurized vessel having positioned therein a core, and preferably an annular core, containing material fissionable by neutrons of thermal energy, or atomic fuel. The controls, or control members, for said nuclear reactor are positioned outside of said pressurized vessel and are subjected only to the hydrostatic pressure of the pool, preferably a light water pool, in which said pressurized vessel is submerged. Said controls are positioned between said pressurized vessel and the reflector which is likewise submerged in said pool. More particularly, we have discovered and now provide for the first time a flux-trap nuclear reactor comprising a pressurized core vessel containing the atomic fuel in preferably an annular core geometry as to provide a high neutron flux, the controls of said nuclear reactor being positioned between said pressurized vessel and the reflector, said controls and said reflector being non-pressurized. In the reactor of this invention said pressurized vessel is pressurized several atmospheres, preferably approximately 3.5 atmospheres, above the hydrostatic pressure of the pool in which it is submerged. Within said pressurized vessel said annular core surrounds a light water island having a test well, or test hole. Said annular core and said light water island are cooled by pressurized light water flowing in a closed loop while the rod gaps of the controls, the reflector, and the center test well, or test hole, are cooled by pool water which is circulated through a separate external cooling loop before being returned to the pool. The amount of overpressure in the pressurized light water, and of course in the pressurized vessel, greatly reduces the flow rates necessary to avoid boiling, yet requires no added wall thickness.

An object of this invention is to provide a relatively inexpensive research nuclear reactor incorporating a flux-trap principle for obtaining relatively high thermal neutron fluxes together with relatively high beamport currents.

Another object of this invention is to provide a relatively inexpensive research nuclear reactor incorporating the flux-trap principle for obtaining relatively high thermal neutron fluxes together with relatively high beamport currents.

Another object of this invention is to provide a research flux-trap nuclear reactor including a pressurized reactor core vessel wherein there are eliminated any control member penetrations and accompanying pressure seals from said reactor core vessel.

Another object of this invention is to provide a research flux-trap nuclear reactor wherein there is eliminated the sub-pile room.

Another object of this invention is to provide a research flux-trap nuclear reactor wherein ion-exchange demineralization requirements are low.

Other objects and features of this invention will become apparent from the following detailed description which is illustrative and not limiting.

Like numerals designate like components.

FIGURE 2 is a top plan view taken on line 2—2 of FIGURE 1 showing particular layout of testing facilities.

FIGURE 3 is a top plan view showing more particularly the geometry of the reflector and thermal shield, or column, including beam hole and tube penetrations for testing purposes.

FIGURE 4 is a partial elevational view in the direction of line 4—4 of FIGURE 3.

FIGURE 5 is a partial elevational view in the direction of line 5—5 of FIGURE 3.

FIGURE 6 is a vertical sectional view take on line 6—6 of FIGURE 7 showing one embodiment of annular core.

FIGURE 7 is a sectional view taken on line 7—7 of FIGURE 6 showing only one fuel element.

FIGURE 8 is a top plan view of a fuel element in one embodiment of the annular core.

FIGURE 9 is a flow diagram showing the closed reactor loop and the external pool cooling loop.

FIGURE 10 is an enlarged detail of the section within line 10 of FIGURE 8.

FIGURE 11 is a side elevational view of the fuel element in FIGURE 7.

FIGURE 12 is a top elevational view of the fuel element in FIGURE 7.

FIGURE 13 is a sectional view on line 13—13 of FIGURE 6 with the fuel assemblies omitted.

FIGURE 14 is a sectional view taken on line 14—14 of FIGURE 6 wherein is positioned a second embodiment of annular core wherein the fuel elements consist of curved fuel-containing plates, and only one fuel element is shown.

FIGURE 15 is a top plan view of a fuel element in the second embodiment of the annular core.

FIGURE 16 is an enlarged detail of the section within line 16 of FIGURE 15.

FIGURE 17 is a side elevational view of the fuel element in FIGURE 14.

FIGURE 18 is a view taken in the direction of line 18—18 in FIGURE 15.

FIGURE 19 is a partial sectional view in perspective including the pressurized reactor core vessel, the reflector, control members, and thermal column.

FIGURE 20 is a graphical representation of the radial flux distribution within the reactor showing thermal neutron flux plotted against radius, or radial distance, in centimeters from the center test hole, or well.

Figure 1:
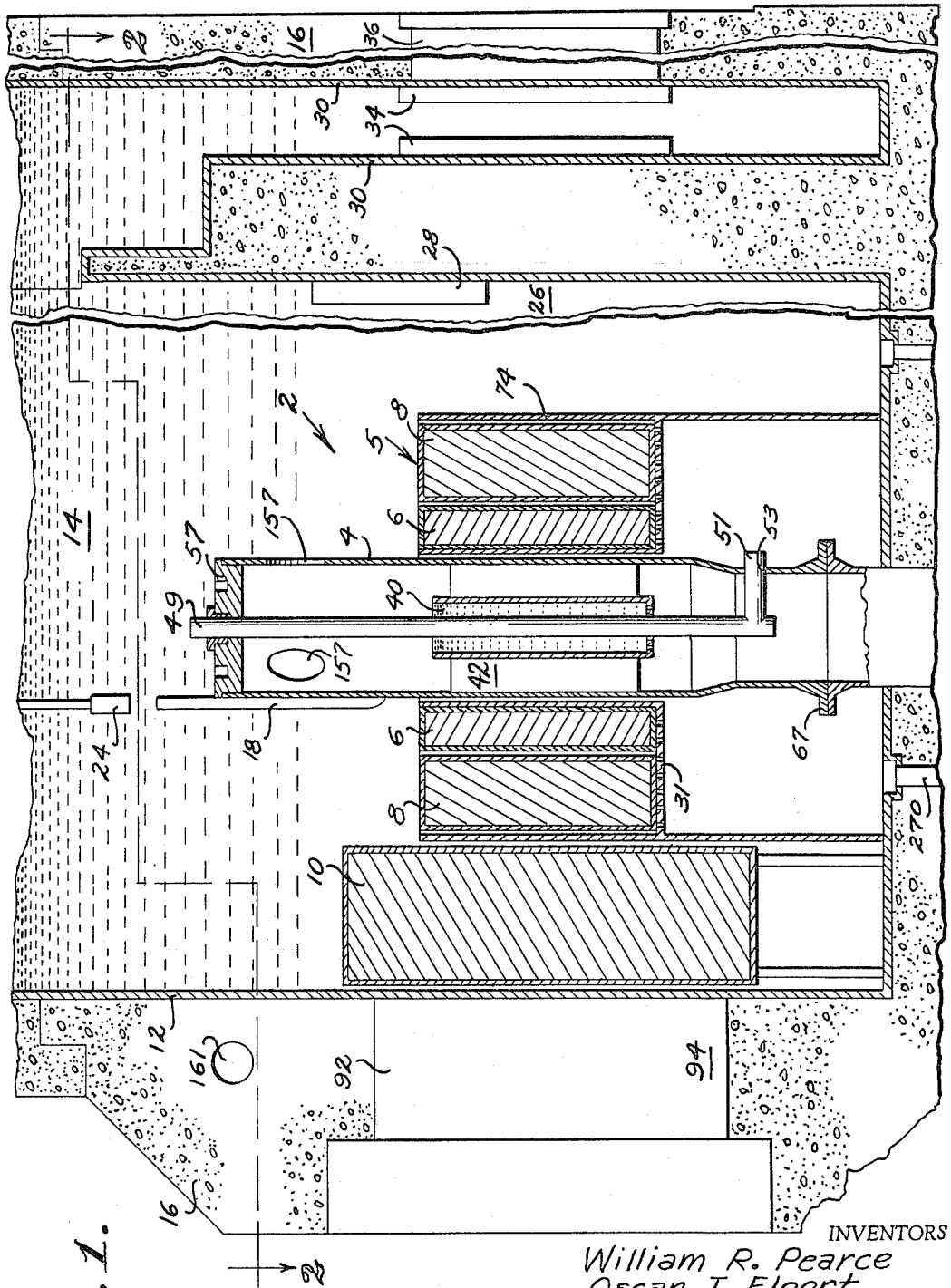
FIGURE 1 is a view in elevation, partially in section and partially in block schematic, of a nuclear reactor of this invention.

More specifically, nuclear reactor 2, including pressurized vessel 4, reflector 5 including inner beryllium reflector portion 6 and outer graphite reflector portion 8, and graphite thermal shield, or thermal column 10, is positioned eccentrically in main pool vessel 12, and said reactor 2 is covered, during operation thereof, by demineralized light water 14. Surrounding reactor 2 is a barytes concrete shield 16, and pool water 14 and shield 16 constitute the radial reactor shield, the density of concrete shield being 3.5 gms./cc. Movably positioned between vessel 4 and beryllium reflector 6, and outside of vessel 4, are control members including four wide blades, or rods, 18 and smaller blade, or regulating rod, 20. Mechanical disconnect 22 is attached to extension rod 24 at a position near upper end of pressurized vessel 4, as clearly shown in FIGURE 1. Attached to pool wall 26 are atomic fuel transfer racks 28, and attached to wall 30 of storage pool 32 are atomic fuel storage racks 34. In shield 16 is removable concrete block 36 plugging the gamma ray exposure facility. Centrally positioned within and extending through pressurized vessel 4 is test well, or test hole, 49 extending through light water island 40 surrounded by annular core 42 containing the atomic fuel, or material fissionable by neutrons of thermal energy, hereinafter more fully described. Pool water 14 passes through test well 49, and, as is clearly shown in FIGURE 1, reactor 2 is submerged in pool water 14 in main vessel 12 during operation of reactor 2. As clearly shown in FIGURES 2 and 3, four radial beam ports 44, 46, 48 and 50 and two tangential beam ports 52 and 54 are provided in and through graphite reflector portion 8 and terminate at the face thereof. Said tangential beam ports 52 and 54 likewise approach pressurized vessel 4 radially but terminate within graphite reflector portion 8 below core 42 and do not view core 42 directly. Coaxially positioned with respect to beam port 44 is beam port 56 extending through beryllium reflector portion 6 and terminating at the face thereof. Coaxially positioned with respect to beam port 50 is beam port 58 extending through beryllium reflector portion 6 and terminating at the face thereof. Sleeves 66, 68, 70 and 72 penetrate reflector retainer wall 74 and then pass through and are positioned in beam ports 44, 46, 48 and 50, respectively, terminating at the face of graphite reflector portion 8. Positioned loosely in each of sleeves 66, 68, 70 and 72 are radial tubes 58, 60, 62 and 64, respectively, each terminating at the face of graphite reflector portion 8. Each of beam, or radial, tubes 58, 60, 62 and 64 is welded to pool wall 26 at the points where they each enter main pool vessel 12. Sleeve 76 and 78 penetrate reflector retainer wall 74 and then pass into beam ports 52 and 54, respectively, terminating at the points of termination of beam ports 52 and 54 within graphite reflector portion 8. Positioned in each of sleeves 76 and 78 are tubes 80 and 82, respectively, each terminating at the points of termination of beam ports 52 and 54, respectively, and likewise at the points of termination of sleeves 76 and 78, respectively, within graphite reflector portion 8. As clearly shown in FIGURE 2, each of beam ports 44, 46, 48, 50, 52 and 54 extend through barytes concrete shield 16 and terminates in each of the respective beam holes, or recesses, 84, 86, 88, 90 and 92, each of which is lined and backed with lead (not shown) to compensate for the reduction in concrete shield thickness and provided with an air-exhaust vent (not shown). Also provided are movable lead gamma shutters (not shown). Positioned in and through said extensions of each of beam ports 44, 46, 48, 50, 52 and 54 are, of course, extensions of tubes 58, 60, 62, 64, 80 and 82, and when each of said tubes is not in use a barytes concrete plug (not shown) is inserted in the respective beam tube extensions and beam holes, or recesses, and each respective tube is sealed with a cover plate (not shown) to permit flooding of the empty portion of the respective tube to complete the shield. Each respective tube would then be flooded with demineralized water through a helical coil (not shown) in said plug, and drained, through a line (not shown) within the shield. Drain and fill valves (not shown) would be recessed in the wall of shield 16 between beam ports. In accordance with good engineering practice, beam port utilities include demineralized water, cold tap water, compressed air, electricity, and off-gas exhaust duct, and leads to the control room (not shown), and all utilities would be manifolded along the ledge (not shown) in the wall of shield 16 about the beam ports, outlets being supplied between the beam ports.

The thermal column, or shield, 10 consists of graphite elements 120, 100, 102 and 122, clad with aluminum and cooled by natural convection of water. Thermal column, or shield, 10 is a "shield-plug facility" and is intended for multiple usage, for example, as a medical irradiation facility or as a location for shielded packages of experimental apparatus. In barytes shield 16 is cavity 92, clearly shown in outline in FIGURES 1 and 2, filled with barytes concrete blocks 94. Graphite elements 96 and 98 of graphite reflector portion 8 and graphite elements 100 and 102 of thermal column 10 are replaceable by similar graphite elements having at least one beam port 84 therethrough, as clearly shown in FIGURE 3, to accommodate or hold empty aluminum cans (not shown) serving essentially as beam port extensions to receive materials to be tested experimentally. Graphite reflector portion 8 includes graphite elements 104, 106, 108, 110, 112, 114, 116 and 118. Thermal column, or shield, 10 includes graphite elements 120 and 122. Graphite reflector portion 8 includes removable graphite reflector elements 7, 9, 11, 13, 15, 17, 19, 21, 23, 25 and 27, eleven in number, as clearly shown in FIGURE 3. As is clearly shown in FIGURES 1 and 19, reflector 5 including beryllium reflector portion 6 and graphite reflector portion 8 is mounted in reflector tank 29 and supported by reflector grid 31. Each of said eleven removable graphite reflector elements is replaceable with modified reflector elements or irradiation baskets containing samples to be irradiated.

Four pneumatic facilities 33, 35, 37 and 39 are down through light water 14 in pool vessel 12 to the irradiation area of the graphite reflector elements 41, 43, 45 and 47 and terminate in each of said elements.

Pressurized reactor vessel 4 is 9 feet in overall length and is fabricated of 6061 aluminum. For the greater part of its length it is 12.34 in. O.D. with ¼ inch wall thickness. Central test well 49 consists of a 1½ inch diameter extra strong aluminum pipe extending through nearly the full length of vessel 4 and conveys pool water for cooling of samples within test well 49. The pipe constituting test well 49 makes a 90° bend to form portion 51 and is welded to the wall of vessel 4 where it penetrates vessel 4 at 53 and enters the lower pool plenum. Stainless steel transition member 55 threadedly engages and is pinned to the wall of vessel 4, and closure or lid 57 threadedly engages member 55. Test well 49 penetrates vessel lid 57 through seal 59 held in place by insert 61 which threads into vessel lid 57. The wall of vessel 4 is penetrated by two 6 inch aluminum inlet lines 63 and 65 at the top portion thereof, and the vessel necks down and has a flange 67 to match a 10 inch flange 69 on the exit line 71 at the bottom. Vessel 4 is supported by flange 69, by reflector grid plate 31 anchored to pool floor 73 by the walls of the lower plenum, as clearly shown in FIGURE 1. The region within pressurized vessel 4 between test well 49 and the wall of vessel 4 is separated into two regions, the annular core 42 and the light water island 40. Perforated annular plate 79 is welded between the lower end of island wall 81 and test well 49 and said plate 79 serves as a flow restriction for the light water of said island 40. Thin spacing ribs 83, 83, 83, 83 are welded between island wall 81 and the outer surface wall of test well 49.

Each fuel element of annular core 42 can be one of two embodiments. One embodiment of the fuel element has twenty-four curved fuel plates 85 each of varying circumferential length spanning the distance between radial side plates 87 and 89 of each element. The maximum curvilinear span of said fuel plates is 4.22 inches. Each fuel plate 85 consists preferably of a 20 mil meat section 187 of U-Al alloy (34 w/o with 6 kg.), clad on both sides with 15 mils of aluminum 189. Each water gap 91 between two adjacent fuel plates 85, 85 is 80 mils thick and 110-mil water gaps 93, 95 are left beyond inner and outer fuel plates 85, 85. The active fuel length of each plate is 24 inches. Fuel element 97 consists of said twenty-four of each of said curved fuel plates 85, and eight of said fuel elements 97 form annular core 42. Each of fuel elements 97 is supported by spider 99 having radial ribs 101 spanning annular core 42 and grooved to form channels 103 for side plates 87 and 89 and each fuel element 97 is held down only by the flow of pressurized light water flowing through so-pressurized vessel 4. Each element 97 is aligned at its top portion by pin 105 resting in slot 107 in island wall 81. Pin 105 is toggled to comb 109 of fuel element 97, so as to point in either of two directions, downward when at bottom of element 97 or inward when at top of element 97, as clearly shown in FIGURE 6, thereby allowing each fuel element 97 to be individually inverted. Each fuel plate is fitted into and positioned in a longitudinally extending groove 111 in side plate 87 and a longitudinally extending groove 113 in side plate 89. Attached to side plates 87 and 89 is lifting bar 115, thereby enabling easy removal of each fuel element 97.

Another embodiment of the fuel element having substantially the same thermal and nuclear characteristics as fuel element 97 is fuel element 117 having a plate curvature conforming to the involute of the circle describing the inner boundary of annular core 42. Involute fuel element 117 consists of seventeen fuel plates 119. Fuel element 117 is supported at the bottom by a shoulder (not shown) on the wall of pressurized vessel 4 and on the light water island wall 81, and said shoulder is notched in sixteen places to accept each of the eight positioning V's 121 on either end of each of fuel elements 117. To invert each of the eight fuel elements 117 at once for the reason that each of side plates 123 and 125 would then curve in the opposite direction, removable alignment pin 127 at the top portion of each fuel element 117 is transferred to the opposite end, and V's 121 then match the second set of eight notches on said vessel-wall shoulder. Each fuel plate 119 is fitted into and positioned in a longitudinally extending groove 129 in side plate 123 and a longitudinally extending groove 131 in side plate 125. Attached to side plates 123 and 125 is lifting bar 133, thereby enabling easy removal of each fuel element 117. All characteristics of involute fuel plate 119 are described by the ratio of outer radius $R_1$ to inner radius $R_0$, which equals 2 in this case, for example:

$$\text{Arc length} = \frac{R_0}{2}\left[\left(\frac{R_1}{R_0}\right)^2 - 1\right] = \frac{3}{2}R_0 = 4.275''$$

Angle of plate incidence at outer radius =

$$\csc^{-1}\left(\frac{R_1}{R_0}\right) = 30°$$

Central angle spanned by terminal points of plate =

$$\left[\left(\frac{R_1}{R_0}\right)^2 - 1\right]^{1/2} + \csc^{-1}\left(\frac{R_1}{R_0}\right) - \frac{\pi}{2} = 39°14'$$

Surrounding pressurized vessel 4 is three foot long, ⅛ inch thick aluminum cylinder 135 providing control rod slots 137 and regulating control rod slot 139 separated from pressurized vessel 4 by aluminum spacers 141. Control rods 18 and regulating control rod 20, as clearly shown, form a nearly complete shroud about annular core 42 and travel in slots 137 and 139, respectively, and are cooled by the pool light water, thereby providing a rod-controlled pressurized reactor without any need for providing pressure seals on any control rod drives (not shown) or extensions (not shown). Control rods 18 and regulating rod 20 are curved blades preferably of Boral clad with aluminum. The four wide blades 18 are shim-safeties, and the smaller blade 20 is the regulating rod controlled either manually or by the flux servo. Mounted on and attached to pressure vessel 4 above said rods 18 and 20 are five tapered slots (not shown) in which are received linear ball bearings 143 in which are guided the lower portions of control rods 18 and 20.

Light water reactor coolant flows downwardly through annular core 42 and light water 40. Flow-restricting plate 79 having small openings 147 therethrough at the base of island 40 causes about 4% of the total flow to be bypassed through island 40. The 10-inch inlet line 149 has a check valve 151 at the outer face of pool wall 26 and is split between two 8-inch lines 153 within pool vessel 12, and each of said two 8-inch lines 153 are reduced to 6-inch line 155 at each of inlets 157 of pressure vessel 4 in order to facilitate clearances of control rods 18 and regulating rod 20 on pressurized vessel 4 of relatively small diameter. Single 10-inch exit line 159 has invert loop 161 buried in barytes concrete shield 16, and said loop 161 extends over cavity 92 and concrete blocks 94 therein. A minimum thickness of three feet of barytes concrete envelopes invert loop 161 to reduce the $N^{16}$ dose rate at the outer face of shield 16 to tenth-tolerance.

Preferably two inches of lead (not shown) is positioned on one side of loop 161 near core 42 elevation to compensate for the concrete displaced by the pipe of invert loop 161. Vacuum breaker valve 163 is connected to the top of invert loop 161 and provides a siphon break thereby ensuring retention of light water above core 42 in the event of an external loop rupture. Manually operated stop valve 165 is provided in exit line 159 preferably outside pool vessel 12 to isolate the reactor loop during unattended periods. Convective loop 200 including pipe portions a, b, c, d and e and fin-tube heat exchanger 202 are provided within pool vessel 12 and in parallel with core 42. Spring-loaded check valve 204 in loop 200 is held closed against its spring (not shown) by the design pressure drop across core 42. Upon loss of flow, valve springs of valve 204 open to permit natural convection through convective loop 200. Bleeder line 206 at the high point of convective loop 200 allows gases to rise and be collected at the top of invert loop 161 so that they will not bind convective loop 200 during operation. In FIGURE 9 the closed loop reactor coolant system for 5 mw. operation is shown in full lines, and for 10 mw. operation the added pipe lines and equipment are shown in dotted lines. For 5 mw. operation there are utilized contrifugal constant-speed pump means 208 having mechanical seals and controlled leakage, heat exchangers 210 and 212 in parallel, 50 g.m.p. mixed-bed demineralizer 214, and pressurizer 216. For 10 mw. operation parallel loop 218 including heat exchangers 220 and 222 and demineralizer 224 are utilized and the capacity of pump means 208 is increased. Reactor-loop heat exchangers 210 and 212 are all aluminum, and the following conditions as set forth in Table 1 apply approximately at 5 mw. and at 10 mw., based upon a total fouling factor at 0.002 and design data for specific heat exchangers.

TABLE 1

(*Reactor-loop heat exhangers 210 and 212*)

| | |
|---|---|
| Tubeside inlet | 158° F. |
| Tubeside outlet | 140° F. |
| Primary flow | 1800 g.p.m. |
| Shellside inlet | 85° F. |
| Shellside outlet | 105° F. |
| Shellside flow | 1600 g.p.m. |
| Required surface per unit | 481 ft.² |
| Number of units | 2 at 5 mw. |
| | 4 at 10 mw. |

At 10 mw. operation and 3600 g.p.m. flow of light water through the closed reactor-loop, pumping requirements are about 100 horsepower. Reactor closed-loop pressure is maintained by compressed air admitted to pressurizer 216 at 80 p.s.i.a. by pressure regulating valve 226. Radiolytic gases plus air are discharged continuously through a fixed orifice (not shown). Liquid level in pressurized vessel 4 is automaticaly controlled between high-level and low-level limits. Single 50 g.p.m. demineralizer 214 at 5 mw. and additional 50 g.p.m. demineralizer 224 at 10 mw. operation maintain sodium activity in said closed reactor-loop at such level that complete mixing with the pool water 14, following shutdown from continuous operation, increases the surface dose rate by ~7 mr./hr. Small heat exchangers 228 and 230 and small heat exchangers 232 and 234, each pair being in series before each of demineralizers 214 and 224, respectively, reduce the coolant temperature from 140° F. to 100° F., thereby extending the resin lifetime. In the coolant lines are manually operated valves 238, 240, 242, 244, 246, 248, 250, 252 and 254. In convective loop 200 fin-tube heat exchanger 256 is added in parallel to heat exchanger 202 for 10 mw. operation.

In the external pool coolant system, pool water 14 is drawn through the reflector gaps, the control rod gaps, and center test well and passes under shield 16. The pool loop includes pump 258, heat exchangers 260 and 262, bypass demineralizer 264, and hold-up tank 266 having baffled internal flow paths. Manually-operated stop valves 268 and 268a are in pool discharge line 270, and check valve 272 is in the pool inlet line 274. Flapper valve 276 is provided on the lower plenum and opens automatically to admit pool water 14 when pump 258 in the pool loop stops, thereby enabling the reflector region to be cooled by natural convection. Multiple units of heat exchangers in series are utilized to maintain reasonable flow velocities and heat transfer coefficients with low available mean temperature difference, and heat exchangers 260 and 262 are utilized for 5 mw. operation, and heat exchanger 276 is added in series-parallel for 10 mw. operation. Each of heat exchangers 260, 262 and 276 is all aluminum and they are each sized on the basis of 100° F. mixed pool water temperature occurring during the hottest days when the design wet-bulb temperature is 78° F. is applicable. The data in Table 2 apply to the heat exchangers 260, 262 and 276 calculated for the pool loop.

TABLE 2

(*Pool-loop heat exchangers*)

| | 5 mw. | 10 mw. |
|---|---|---|
| Arrangement | 2 in series | 3 in Series-Parallel. |
| Tubeside inlet | 107.2° F | 108.0° F. |
| Tubeside outlet | 97.5° F | 97.7° F. |
| Primary flow | 350 g.p.m | 500-250 g.p.m. |
| Shellside inlet | 85° F | 85° F. |
| Shellside outlet | 95° F | 95° F. |
| Secondary flow | 350 g.p.m | 500-250 g.p.m. |
| Total fouling factor | 0.0015 | 0.0015. |
| Required surface | 435 ft.² | 676 ft.² |

Single 50 g.p.m. demineralizer 264 at 5 mw. operation and demineralizer 264 with 50 g.p.m. demineralizer 278 at 10 mw. reduce the $Na^{24}$ dose rate at the pool surface to about 4 mr./hr. during continuous operation. The sodium dose rate will be less than half this value with 8-hour daily operation. On each side of demineralizer 278 are manually operated stop valves 280 and 282. The 29.4 sec. $O^{19}$ activity in the mixed flow entering lower plenum 284 is 32,000 dis./cc.-sec. at 10 mw. and 500 g.p.m. flow. At 10 mw. operation a 1350-gallon hold-up tank 266 added to the pool loop volume of ~350 gallons provides a 3.4-minute total hold-up before discharge into the pool vessel 12, thereby reducing the pool surface dose rate to 5 mr./hr., if the return is directly to the surface and to 0.1 mr./hr. if complete mixing occurs within the pool. At 5 mw. operation and 350 g.p.m. flow, 500 gallons less hold-up yields nearly the same dose rate. The 7.4-sec. $N^{16}$ gammas and the 4-sec. $N^{17}$ neutrons contribute negligible activity to the pool because of the long decay time necessitated by $O^{19}$. Flapper valve 276 is similar to those which have been previously installed on open-pool reactors and is so constructed that an adjustable weight (not shown) is set so that gravity opens it when pump suction is lost, and under ideal conditions valve 276 is closed automatically by pump suction when pump 258 starts; however, valve 276 is closed manually, as by a pull-chain (not shown), after pump 258 is started and prior to withdrawal of control rods 18. Also available is demineralizer 284 having on each side manually operated stop valves 286 and manually operated stop valve 288 in line 290. On each side of demineralizer 264 are manually operated stop valves 292 and 294, and in line 296 is manually operated stop valve 298. Also in reactor closed-loop coolant system are check valve 300 and manually operated stop valve 302. In the secondary coolant system two-cell cooling tower units (not shown) are provided to cool 2,400 g.p.m. from 105° F. to 85° F. with a design wet-bulb temperature of 78° F. One two-cell unit (not shown) is utilized for initial 5 mw. operation and another two-cell unit is added thereto for 10 mw. operation.

Make-up water enters line 304 having manually operated stop valve 306 and passes through softener 308 and then through 10 g.p.m. make-up demineralizer 310 to demineralizer storage tank 312 having a 10,000 gallon capacity. Raw water enters line 314. In line 316 is manually operated stop valve 318, and in lines 320 and 322 are manually operated stop valves 324 and 326. In line 328 is manually operated stop valve 330, and in line 332 is manually operated stop valve 334. Centrifugal constant-speed pump means 336 from which leads line 338 having manually operated valves 340 and 342 and also line 344 having manually operated valve 346 is utilized. Bypass line 348 having manually operated valve 350 leads from demineralizer water storage tank 312 to line 344. In FIGURE 9 the arrows indicate the flow of coolant.

Reactor data for 5 mw. operation and 10 mw. operation are summarized in Table 3, as follows:

TABLE 3

*(Reactor data summary)*

| Power | 5 Mw. | Either | 10 Mw. |
|---|---|---|---|
| Initial Power Capability. | 5 Mw. | | |
| Eventual Power Modifications. | | | 10 Mw. |
| Average Power Density in Annular Core. | 155 Kw/liter | | 310 Kw/liter. |
| *Region-Averaged Thermal Neutron Flux* | | | |
| In Test Hole with $H_2O$. | $2.26 \times 10^{14}$ | | $5.51 \times 10^{14}$. |
| In Test Hole with $Na.^1$ | $1.89 \times 10^{14}$ | | $3.78 \times 10^{14}$. |
| In Core | $3.03 \times 10^{13}$ | | $5.56 \times 10^{13}$. |
| *Reactor Core* | | | |
| Geometry | | | Annular. |
| Inner Fuel Radius | | | 2.77 in. |
| Outer Fuel Radius | | | 5.81 in. |
| Active Fuel Height | | | 24 in. |
| Volume | | | 32.227 liters. |
| Fuel Loading | | | ~5.5 Kg U. |
| Fuel Alloy | | | U-Al alloy. |
| Uranium Content | | | 34 w/o. |
| Cladding | | | Al. |
| Number of Elements | | | 8. |
| Element type | | | Curved plate. |
| Fuel plates/element | | | 24. |
| Gap Thickness | | | .080 in. |
| Fuel Plate Thickness | | | .050 in. |
| Meat Thickness | | | .020 in. |
| Clad Thickness | | | .015 in. |
| *Reflector* | | | |
| Inner Reflector | | | Be canned in Al. |
| Overall Thickness. | | | 2.96 in. |
| Outer Reflector | | | Graphite canned in Al. |
| Overall Thickness. | | | 9 in. |
| Height | | | 36 in. |
| Coolant | | | Pool Water. |
| *Control Rods* | | | |
| Location | | | Outside Vessel. |
| Type | | | Curved Plate. |
| Material | | | Boral. |
| Clad | | | Al. |
| Overall Thickness | | | 3/16 in. |
| Number: | | | |
| Shim-Safeties | | | 4. |
| Regulating | | | 1. |
| *Test Hole* | | | |
| Inner Diameter | | | 1.5 in. |
| Coolant | | | Pool Water. |
| *$H_2O$ Island* | | | |
| Thickness | | | 1.575 in. |
| Coolant | | | Reactor Loop Water. |
| *Core Coolant* | | | |
| Total Flow Rate | 1,800 g.p.m. | | 3,600 g.p.m. |
| Coolant Pressure: | | | |
| At Pressurizer | 80.3 p.s.i.a. | | 80.3 p.s.i.a. |
| At Core Inlet | 78.9 p.s.i.a. | | 75.0 p.s.i.a. |
| At Core Exit | 73.6 p.s.i.a. | | 55.7 p.s.i.a. |
| Inlet Temperature | 140° F | | 140° F. |
| Outlet Temperature | 157.4° F | | 157.9° F. |
| Demineralizer Flow | 50 g.p.m | | 100 g.p.m. |
| Loop Volume with Pressurizer. | 2,000 gal. | | 2,300 gal. |
| *Pool Coolant* | | | |
| Heat Removal Load | 10% | | 7.5%. |
| Flow Rate | 350 g.p.m. | | 500 g.p.m. |
| Max. Mixed Pool Temperature. | 100° F | | 100° F. |
| Pool Inlet Temperature. | 97.5°F | | 97.7°F. |
| Pool Exit Temperature. | 107.2° F | | 108.0° F. |
| Demineralizer Flow | 50 g.p.m | | 100 g.p.m. |
| Pool Volume | 20,700 gal. | | 20,700 gal. |
| Holdup Tank Volume. | 1,350 gal | | 1,350 gal. |
| *Heat Transfer— Reactor Loop* | | | |
| Heat Transfer Area | | 190 ft.² | |
| Heat Flux, B.t.u./hr-ft.²: | | | |
| Average | $0.84 \times 10^5$ | | $1.68 \times 10^5$. |
| Maximum | $2.54 \times 10^5$ | | $5.08 \times 10^5$. |
| Radial Max./ave. | | 1.84 | |
| Axial Max./ave. (assumed). | | 1.64 | |
| Hot Channel Factors: | | | |
| Bulk Temperature. | | 1.275 | |
| Film Drop | | 1.350 | |
| Max. Wall Temp | 267° F | | 270° F. |
| Pressure Drop: | | | |
| Fuel Element | 5.3 p.s.i | | 19.3 p.s.i. |
| Reactor Loop | ~11 | | ~40. |
| *Control* | | | |
| Reactivity Requirements, $\Delta k/k$. | | | |
| 400 MWD Fuel Burnup + Fission Products. | | | 0.021. |
| Xenon and Samarium. | | | 0.054. |
| Temperature Effect | | | 0.004. |
| Minimum Reactivity Requirement. | | | 0.079. |
| Available for Experiments. | | | 0.038. |
| Cold Clean Reactivity. | 0.110 | | 0.117. |
| Rod Worth With Complete Shroud of Thermal Poison, Reactor Hot Clean, $\Delta k/k$. | | | 0.1748. |
| Core Lifetime | 400 MwD | | 400 Mwd. |
| Average Fuel Burn-up. | 10.34% | | 9.47%. |

¹ Na is chosen only to represent a typical absorbing material.

Experimental Facilities:
 1 1.5 in. D. center test hole.
 4 Radial beam ports.
 2 Tangential beam ports.
 1 Shield plug facility.
 4 1.5 in. I.D. pneumatic facilities.
 11 Reflector irradiation baskets.
 1 Gamma exposure facility.

The more significant design parameters are summarized as follows:

(1) Initial power capability _____ 5 mw.
(2) Eventual power level with additional equipment _____ 10 mw.
(3) Coolant _____ 40–80 p.s.i.a. light water.
(4) Fuel _____ ~5.5 kg. U-Al alloy in Al plates, clad with Al.

(5) Dimensions of fuel annulus --- 25 inches high, 5.54 inches inside diameter, 11.62 inches outside diameter.
(6) Reflector _____ Be+graphite.
(7) Control _____ External rod shroud between pressurized vessel and reflector.
(8) Shielding _____ 29 foot pool with barytes concrete walls.

While the specific fuel described is U-Al alloy, other fuel materials may be used. For example, uranium enriched to 90% $U^{235}$, $Pu^{239}$, $U^{233}$, and mixtures of fissionable materials, such as $U^{235}$ and $Pu^{239}$, may be used as the fissionable component of the reactor fuel material. The critical masses of fissionable materials may be determined for particular reactor active portion configuration according to methods disclosed in the prior art publications, supra. While beryllium is disclosed as a reflector material, other reflector materials, such as beryllium oxide, may be used.

Many alterations and changes may be made without departing from the spirit and scope of this invention which is set forth in the appended claims which are to be construed as broadly as possible in view of the prior art.

We claim:

1. A nuclear reactor comprising, in combination, a main vessel, a pressurized vessel positioned in said main vessel, a pressurized annular core containing material fissionable by neutrons of thermal energy, said annular core being positioned within said pressurized vessel, a pressurized light water island within said pressurized vessel, a test well centrally positioned in and extending through said island, said annular core surrounding and being spaced from said light water island, a non-pressurized reflector positioned in said main vessel, said reflector being positioned about said pressurized vessel, non-pressurized reactor controls movably positioned between said pressurized vessel and said non-pressurized reflector, means for passing coolant through said main vessel, and closed loop means for passing pressurized coolant through said pressurized vessel, whereby the flow rates of each of said respective coolants necessary to avoid boiling are greatly reduced, and whereby there is attained a maximum neutron accessability for experimentation in said test well.

2. A nuclear reactor comprising, in combination, a main vessel containing light water, said light water forming a pool in said main vessel, a pressurized vessel submerged in said light water forming said pool, a pressurized annular core containing material fissionable by neutrons of thermal energy, said pressurized annular core being positioned within said pressurized vessel, a pressurized light water island within said pressurized vessel, a test well centrally positioned in and extending through said island, said annular core surrounding and being spaced from said light water island, a non-pressurized reflector submerged in said light water forming said pool, said non-pressurized reflector being positioned about said pressurized vessel, non-pressurized reactor controls submerged in said light water forming said pool and being movably positioned about said pressurized vessel and between said pressurized vessel and said non-pressurized reflector, means for passing light water coolant through said main vessel, and closed loop means for passing light water coolant pressurized to a pressure above the hydrostatic pressure of said pool through said pressurized vessel, whereby the flow rates of each of said respective coolants necessary to avoid boiling are greatly reduced, and whereby there is attained a maximum neutron utilization coupled with maximum accessibility for experimentation within said test well.

References Cited by the Examiner

UNITED STATES PATENTS

| | | | |
|---|---|---|---|
| 2,837,476 | 6/1958 | Busey | 204—193.2 |
| 2,852,456 | 9/1958 | Wade | 176—18 |
| 2,857,324 | 10/1958 | De Boisblanc | 176—17 |
| 2,865,826 | 12/1958 | Stewart. | |
| 2,992,982 | 7/1961 | Avery | 176—17 |
| 3,003,941 | 10/1961 | Drolshagen et al. | 176—33 |
| 3,048,534 | 8/1962 | Tonks | 176—35 |
| 3,052,613 | 9/1962 | Wigner | 204—154.24 |
| 3,149,044 | 9/1964 | De Boisblanc et al. | |
| 3,165,447 | 1/1965 | Stephenson. | |

OTHER REFERENCES

Lane, TID–7559 (Part I), AEC "Fuel Element Conference" published August 1959, pp. 9 to 27.

Leyse et al., AECU–3775, "An Advanced Engineering Test Reactor," published March 15, 1958. Specific reliance is on pages 17–22, 28–44, 92–100, and 177–185 and 202–208.

References Cited by the Applicant

UNITED STATES PATENTS 2,708,656   5/1955   Fermi et al.

L. DEWAYNE RUTLEDGE, *Primary Examiner.*

CARL D. QUARFORTH, REUBEN EPSTEIN,
*Examiners.*

P. G. BETHERS, J. V. MAY, *Assistant Examiners.*